United States Patent [19]
Rousseau

[11] Patent Number: 5,159,306
[45] Date of Patent: Oct. 27, 1992

[54] DEFLECTION YOKE LINER WITH INTERCONNECTABLE SECTIONS

[75] Inventor: Jean Rousseau, Auxonne, France
[73] Assignee: Videocolor, Paris la Defense, France
[21] Appl. No.: 799,221
[22] Filed: Nov. 27, 1991
[30] Foreign Application Priority Data
Nov. 30, 1990 [EP] European Pat. Off. ........ 90403411.3
[51] Int. Cl.⁵ ........................ H01F 7/00; H04N 5/645
[52] U.S. Cl. .................................... 335/210; 358/248
[58] Field of Search ................... 335/210–214; 313/340; 358/248

[56] References Cited

U.S. PATENT DOCUMENTS

| | | | |
|---|---|---|---|
| 3,163,794 | 12/1964 | Bloomsburgh | 335/210 |
| 3,350,592 | 10/1967 | Mason | 335/210 |
| 3,684,987 | 8/1972 | Nishida | 335/210 |
| 4,096,531 | 6/1978 | Yamada | 358/248 |
| 4,206,481 | 6/1980 | Imahashi et al. | 358/248 |

FOREIGN PATENT DOCUMENTS 185848 8/1986 Japan ................................ 335/210

Primary Examiner—Leo P. Picard
Assistant Examiner—Raymond Barrera
Attorney, Agent, or Firm—Joseph S. Tripoli; Joseph J. Laks; Sammy S. Henig

[57] ABSTRACT

A deflection yoke liner for mounting deflection coils on a cathode ray tube; the liner has at least two interconnectable sections with interengaging snap fasteners in the form of a tab and block that position and fix together the liner sections. The tab has a stop or hook adjacent a distal end for clasping over the block. The block has an inlet groove for guiding the tab and thereby positioning the liner sections relative to one another. One of the groove and tab tapers inwardly and the other is complementary and tapers outwardly. Preferably the tapering sections of the groove and tab engage near a point of full abutment of the liner sections, by way of tapered shoulders at the proximal end of the tab and a narrowing inlet taper on the block. The liner sections are positively positioned as the tab is advanced in the groove until the hook snaps over the abutment upon bringing together the liner sections. The block can be discrete or formed by a continuous ridge. The block and the tab protrude axially above a surface of the flange, the tab width being oriented along a flange of the respective liner section. This mechanism gives an accurate and quick positioning of the supporting liner parts and finds use in deflection yokes for cathode ray tube displays.

15 Claims, 4 Drawing Sheets

DEFLECTION YOKE LINER WITH INTERCONNECTABLE SECTIONS

This invention relates to the field of deflection yoke liners for mounting deflection coils on a cathode ray tube, and in particular to a liner having sections which engage via a clasp mechanism that accurately positions the sections relative to one another during final phases of their assembly. The clasp mechanism permits initial assembly based upon less accurate positioning of the sections, followed by centering and clasping action effected by complementary structures which abut when the sections are urged more closely together, to fix the liner sections accurately in relative position.

Cathode ray tube deflection yokes or coils are typically mounted on the tube via a plastic supporting liner. The usual liner is a thin plastic funnel shaped form, longitudinally divided into two injection molded sections. The sections can be attachable via clasp mechanisms to form the funnel shaped liner. The deflection coils are wound on the funnel shaped liner, which is placed on the neck of the tube at the rear of a conical section of the tube. The liner fits closely against the surface of the tube, for placing the deflection coils mounted on the liner as near as possible tot he electron beam to be deflected within the tube.

According to a known design of such a deflection yoke liner, the liner is formed in two lateral sections which snap together along a median plane via clasps and positioning pins, i.e., along a plane parallel to the electron beam axis or Z axis of the tube. The liner sections each have flanges perpendicular to the Z axis at the larger diameter end and at the smaller diameter end of the funnel shaped liner. Pins, for locating the two sections relative to one another, as well as clasps, for attaching the sections across the median plane, are needed to obtain accurate positioning of the two sections and also to fix the sections together structurally. The pins protrude across the midplane to engage in corresponding holes, and snap clasps engage upon full insertion of the pins, to hold the two liner sections against separation.

The dimensions and arrangement of the deflection yoke liner sections, as well as the interengaging structures thereof, affect the dimensions and operation of the electrical deflection coils to be mounted on the liner. It is desirable to provide in the liner a means to mount the coils immediately adjacent the tube in precisely defined positions, and to keep the liner and the coils as compact as possible. The dimensions of the liner in the Z axis direction are especially important because the overall deflection coil arrangement should be as short as possible in the Z axis direction to minimize the focal length of the deflection apparatus. It is also desirable to minimize Z axis length generally, thereby allowing a more compact television or the like.

According to known deflection yoke liners, certain trade-offs are made to balance the interests of good structural connection of the facing liner sections, and minimal dimensions. Unfortunately, these trade-offs often involve interengaging structures which make the liner sections difficult to attach together or which fail to ensure that the two liner sections are accurately positioned relative to one another.

Where liner sections are attached by clasps and pins, the pins achieve the necessary relative alignment of the facing sections but do not contribute to fixing the facing sections against separation. Separation is prevented by the clasps, however known clasps are not as effective as pins for ensuring accurate relative position of the liner sections. The clasps typically involve a protruding tab with an L-shaped surface near the end of the tab, which L-shaped surface forms a stop that snaps over an abutment raised on the facing section to form a complementary counter stop structure. The abutment can be a ridge on the facing section, in which case the back side of the ridge forms the counter stop. When the facing sections of the liner are brought together, the tab resiliently deforms to pass over the ridge. The tab snaps downwardly over the ridge to engage the stop against the counter stop when the facing sections are brought fully into abutment.

The L-shaped section defining the stop can face radially inwardly or outwardly. If the stop faces inwardly, a ridge or block on the surface of the facing section can define the counter stop. The tab thus deforms outwardly from the surface and snaps inwardly upon full abutment of the sections. If the stop on the tab faces outwardly, the tab is passed through an opening in the facing section, e.g., defined by an inverted U bow raised from the surface. The tab thus deforms inwardly until full abutment of the sections and then snaps outwardly to lock. In the latter case the top of the inverted bow defines the counter stop.

The tab deforms resiliently to pass over the counter stop. Where the tab deforms outwardly, there is normally no structure associated with the counter stop which restricts the extent to which the tab can be deformed. As a result, the liner sections can be abutted at improper relative positions. The two sections of the liner are usually provided with diametrically opposite tabs that clasp in opposite directions. Absent the use of locating pins, only the resilient pressure of these opposite tabs would tend to locate the engagement of the facing sections. Whereas a more positive positioning is desirable, locating pins have been considered necessary. The locating pins protrude from one liner section to engage closely in a bore in the opposite liner section of equal diameter. However, the locating pins require that the facing sections are accurately positioned manually before the facing sections can be brought together, because this is necessary to initially engage the pins in the bores.

In one prior art arrangement, a clasping tab is passed through an opening in the facing section, for example through the opening defined by a U bow. In this case, the tab and U bow engagement likewise does not position the facing sections of the liner positively. This occurs because the opening for the tab is large enough to accommodate the distal end of the tab, which is necessarily larger than the proximal end of the tab behind the stop. In the fully abutting arrangement of the liner sections, it is the proximal section of the tab, rather than the distal section of the tab, that is disposed in the opening. The opening is dimensioned to accommodate the distal section. Therefore, a tab and U bow arrangement cannot positively position the facing sections of the liner to the same extent as a pin which fits closely into an opening the same size as the pin. Positioning is accomplished according to the art by using locating pins, i.e., pins on each section inserted into a closely fitting bore in the respective facing section.

When attaching the facing sections of the liner in an embodiment having pins, the assembler must use some care to align the pins. It is typically necessary to tend to alignment of pins on both surfaces at which the liner sections are to abut (each section typically having both a pin and a hole for a pin protruding from the other section). With the pins aligned, further pressure engages the stop and counter stop of the clasp. By aligning the pins and forcing together the liner sections, usually with some relative wiggling of the liner sections being necessary while urging them together, the assembler moves the two sections together until the stop and counter stop engage to lock them. It is possible to arrange the pins and tabs to be of equal length; however, this merely increases the number of engagements to be made simultaneously. Whether the pins and clasps are equally long or unequally long, the assembler still needs to carefully align the facing sections to engage the pins. It would be desirable to obtain an engagement structure wherein the assembler is relieved of the need to very carefully align the parts prior to assembling them.

In addition to assembly considerations, an engagement having pins which fit in holes increases the thickness of the liner section at least in the area of the hole. The hole is, typically, bounded by liner material, thereby requiring a thickness in excess of the diameter of the pin (e.g., a thickness of two or more times the pin diameter).

The orientation and location of the clasp structure also affects the dimensions of the liner, the thickness of the liner, and the amount of space available for receiving the deflection coils. In known designs the tabs can be elongated toward the plane of abutment of the liner sections, with a width dimension oriented in the plane of the flange, or parallel to the Z axis.

According to an aspect of the invention, a particular arrangement of a clasp tab and block provide at the same time for alignment and clasping engagement of the two liner sections. Instead of aligning pins and closely fitting holes, the assembler of the present liner need only bring the tab and its corresponding block into engagement, and alignment follows due to a guideway formed on the block and tapering contours for the block and the tab, which come into engagement upon nearly full insertion of the tab into its clasping position. The tab is preferably substantially disposed in a plane parallel to the plane of a flange end of a respective liner section, which conserves space for the coil windings and reduces the overall length of the liner to a minimum. The complementary tapering contours of the tab and the block provide positive and precise positioning, while enabling very easy initial connection of the liner sections. The assembler need only align the parts generally before pushing them into snap engagement of the tab(s) and block(s).

It is an aspect of the invention to improve the accuracy of positioning and ease of assembly of deflection yoke liner sections by providing a tab and block clasp with structure for guiding the tab into clasping position on the block.

It is another aspect of the invention to reduce the need for alignment pins in deflection yoke liners, by serving both clasping functions and alignment functions in a clasping tab arrangement wherein the tab and corresponding block include complementary tapers guiding the tab positively into position upon full abutment of the liner sections, and enabling initial insertion with only general positioning of the liner sections.

It is still another aspect of the invention to reduce the dimensions of a sectional deflection yoke liner by reducing the size and number of connecting structures engaging between the liner sections, providing an alignment and clasping arrangement mounted on flanges of the liner sections.

These and other aspects of the invention are realized in a liner for supporting a deflection yoke on a cathode ray tube having at least two interconnectable sections with interengaging snap fasteners in the form of a tab and block that position and fix together the liner sections. The tab has a stop or hook adjacent a distal end for clasping over the block. The block has an inlet groove for guiding the tab and thereby positioning the liner sections relative to one another. One of the groove and tab tapers inwardly and the other is complementary and tapers outwardly. Preferably the tapering sections of the groove and tab engage near a point of full abutment of the liner sections, by way of tapered shoulders at the proximal end of the tab, complementary to a narrowing inlet taper on the front of the block. The liner sections are positively positioned as the tab is advanced in the groove until the hook snaps over the abutment upon bringing together the liner sections. The block can be discrete or formed by a continuous ridge. The block and the tab protrude axially above a surface of the flange, the tab width being oriented along a flange of the respective liner section. An exemplary embodiment of the invention is shown in the drawings, wherein:

Figure 7:
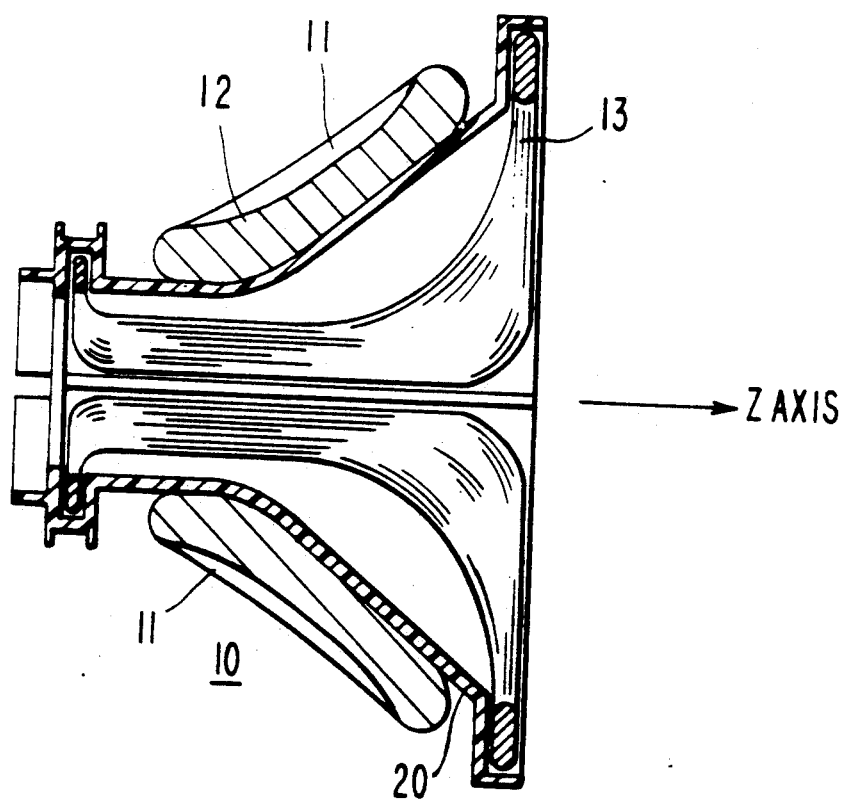
FIG. 7 is a side elevational cross-sectional view of a television deflection yoke that includes the liner sections of FIG. 2.

Referring to FIG. 7, there is shown a deflection yoke 10 comprising a pair of vertical deflection coils 11 toroidally wound on a magnetically permeable core 12, and a pair of saddle type horizontal deflection coils 13. A deflection yoke liner 20 electrically and physically separates the vertical and horizontal deflection coils and may provide support and alignment structure not generally illustrated for the coils and the core.

Figure 1:
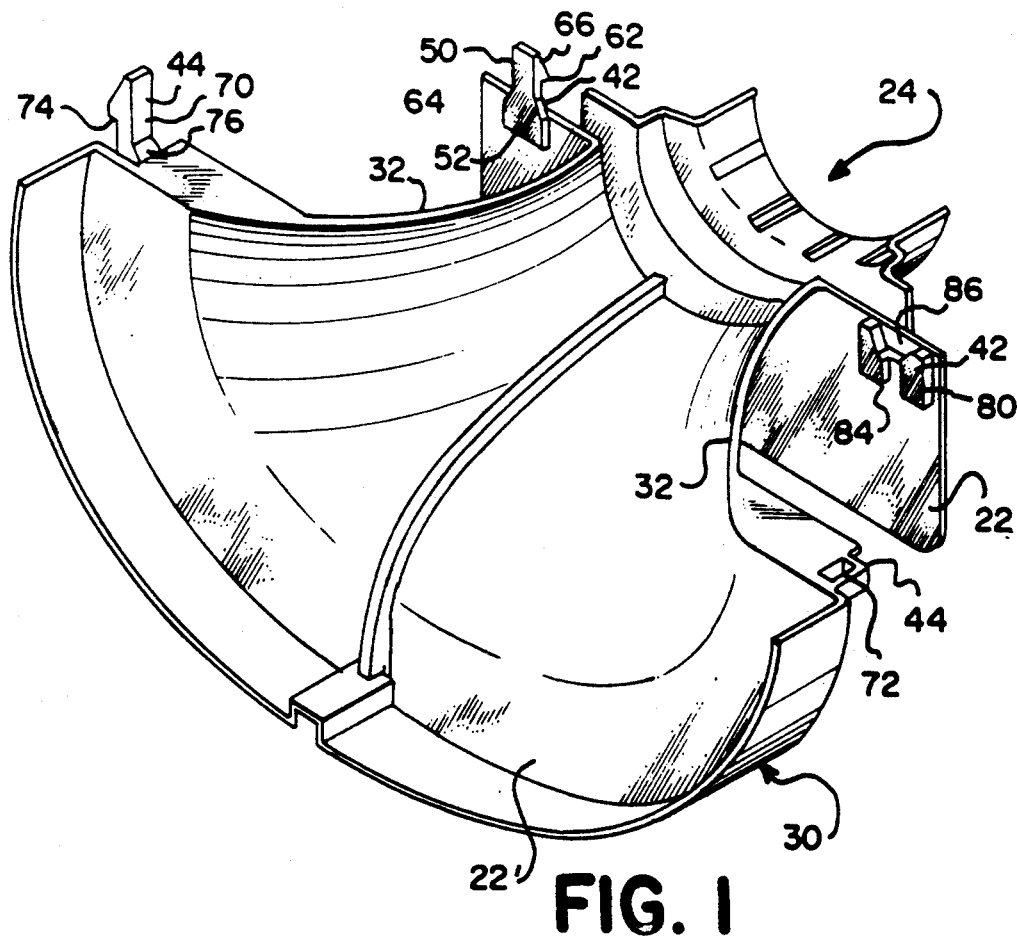
FIG. 1 is a perspective view of a sectional deflection yoke liner section according to the invention.
Figure 2:
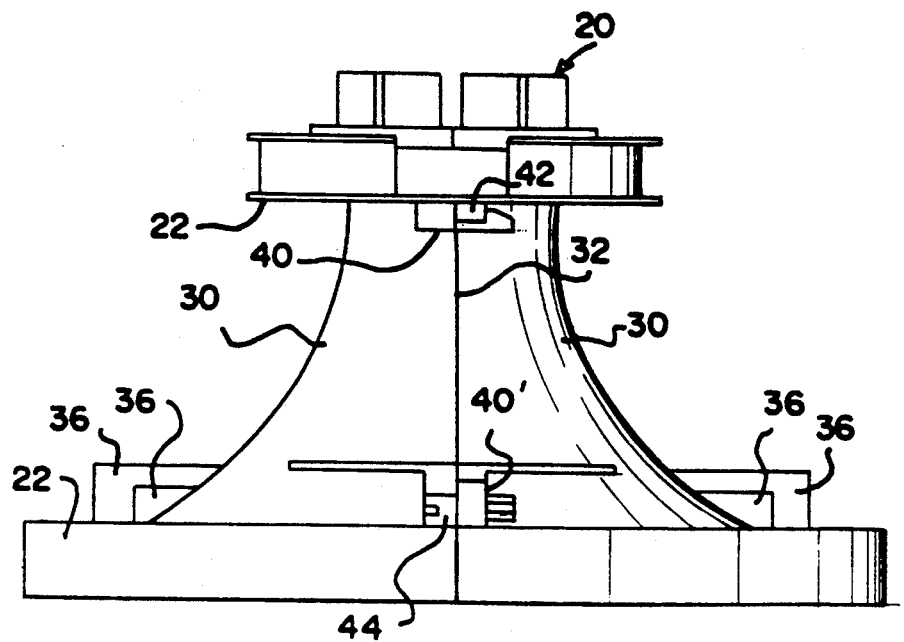
FIG. 2 is a side elevation view of two said liner sections as attached together.

A deflection yoke liner section 30 as shown in FIG. 1 is connectable with an identical liner section 30 to form the deflection yoke liner 20 as shown in FIGS. 7 and 2. Similar symbols and numerals in FIGS. 1, 2 and 7 indicate similar items or functions. The liner 20 of FIG. 2 is a funnels-shaped form for receiving the deflection coils and for positioning the coils in close proximity to the surface of a cathode ray tube, for example of a television set. The liner fits over the neck of the tube at the rear of the flaring or conical portion of the tube, with the tube residing in central opening 24 of the liner. The coils are wrapped over the walls of liner 20 in the space between the end flanges 22 and 22'
to define vertical and horizontal loops on opposite sides of the tube, i.e., on opposite sides of the deflection yoke liner. Preferably the coils are mounted as compactly as possible on the surface of the yoke liner 20, and are positioned as accurately as possible. Normally the horizontal deflection coils are placed on the inner surface of the liner (to reside against the surface of the tube) and the vertical deflection coils are wound toroidally on a core and placed on the outside of the liner. Accurate positioning of the coils requires that the sections 30 of the liner 20 be assembled accurately and securely.

The liner is of course assembled before the coils can be placed. The liner sections 30 are pressed together in a direction perpendicular to their plane of abutment, which is a central plane including the longitudinal axis or Z axis defined by the liner and the tube. When the sections abut fully, snap fasteners 40 and 40' engage to lock the sections 30 in abutment along their edges 32, in the plane of abutment. Preferably according to the invention the connection of the liner sections 30 is substantially exclusively obtained by the fasteners 40 and 40', which accomplish both positioning and locking of the liner sections and obviate the need for locating pins.

Fasteners 40 and 40' are provided in complementary sets at each end of the abutting walls 32, and preferably are disposed on or adjacent both axial end flanges 22 and 22'. The fasteners 40 and 40' are elongated in the insertion direction, namely perpendicular to the abutment plane. On the smaller flange 22, the fastener 42 is oriented to have a width extension parallel to the flange 22 and 22'. On the larger flange the fastener 44 has a width extension perpendicular to the flange. The fasteners 40 and 40' as shown are disposed near the radial outside edge of their respective flanges.

The smaller flange fastener 42, embodying an aspect of the invention, with its width extension parallel to the flange resides closely adjacent the lower surface of the smaller flange as shown in FIG. 2. Therefor fasteners 42 occupy a minimum amount of space otherwise available for the deflection coils. On the larger flange the fasteners 44 are disposed below the tops of reinforcing ridges 36 and also do not interfere with the space available for the coils. The liner sections are identical and arranged such that at each fastener a clasp tab with a hook or stop engages with a counter stop formed on the facing section.

The smaller flange has fasteners 42, including a tab 50 engageable over a block 80. The tabs 50 are arranged to protrude across the line of abutting edges 32, and extend substantially parallel to the plane of the respective end flanges 22.

Figure 3:
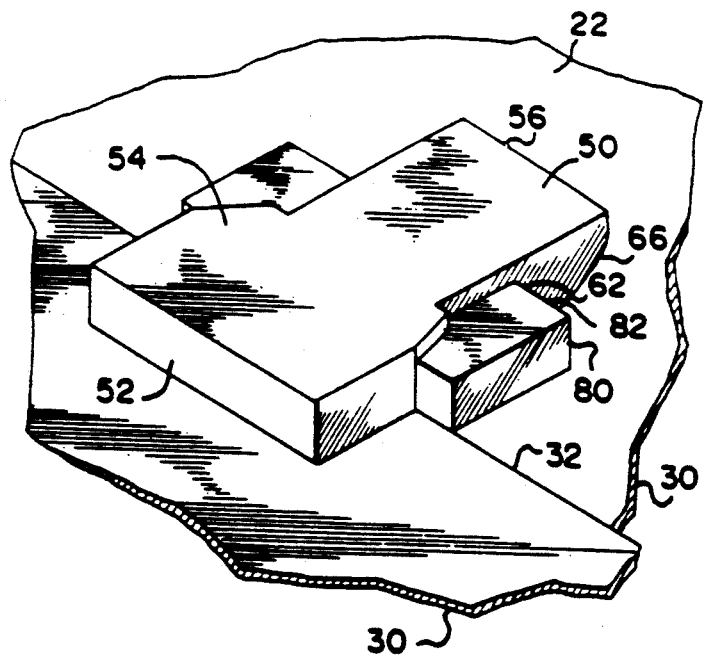
FIG. 3 is a detailed perspective view showing the positioning clasp on the smaller flange of the liner.
Figure 4:
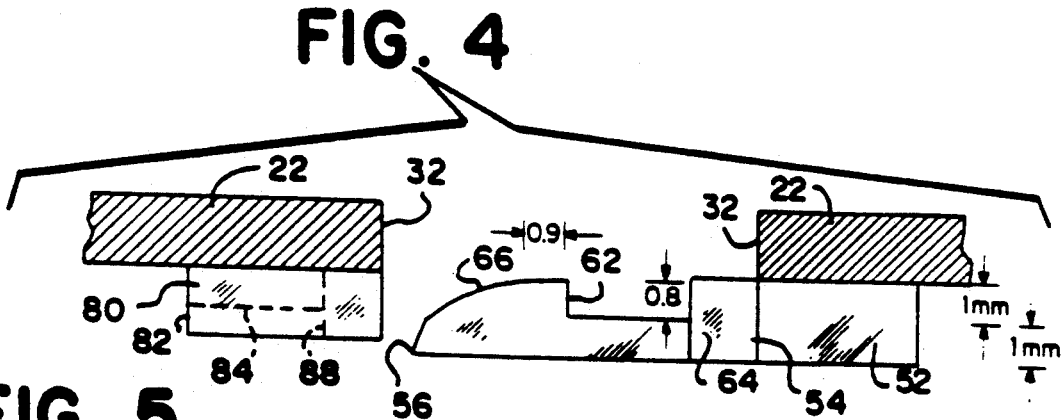
FIG. 4 is a partial section view through the smaller flange in FIG. 2, with the clasp elements disassembled.

FIGS. 3-6 illustrate various views of fasteners 42. Similar symbols and numerals in FIGS. 1-7 indicate similar items or functions. With reference to FIGS. 2 and 3, the tab 50 is spaced slightly above the surface of the end flange 22, for example being molded on a standoff block 52 such that the tab is spaced from the flange surface. Tab 50 has a proximal end 54 attached to the standoff block 52 and a distal end 56 that protrudes to engage the facing section. As also shown in FIG. 4, adjacent the distal end 56 the tab 50 has a stepwise change in thickness, defining a stop or hook 62, which engages on the block 80 of the facing liner section when the two liner sections are brought together such that the edges 32 of the sections abut.

Block 80 is slightly wider than the widest dimension of tab 50. The surface of the block is dimensioned to complement the tab when the liner sections are brought together, and thus to lock the liner sections accurately in their required relative positions.

The tab 50 is resiliently lifted in passing over block 80, and thus resiliently snaps downwardly to engage the block when the hook or stop 62 passes the far edge of block 80. The distal end of tab 50 is preferably tapered to define a ramp 66 for resiliently deflecting the tab when passing over block 80.

Figure 5:
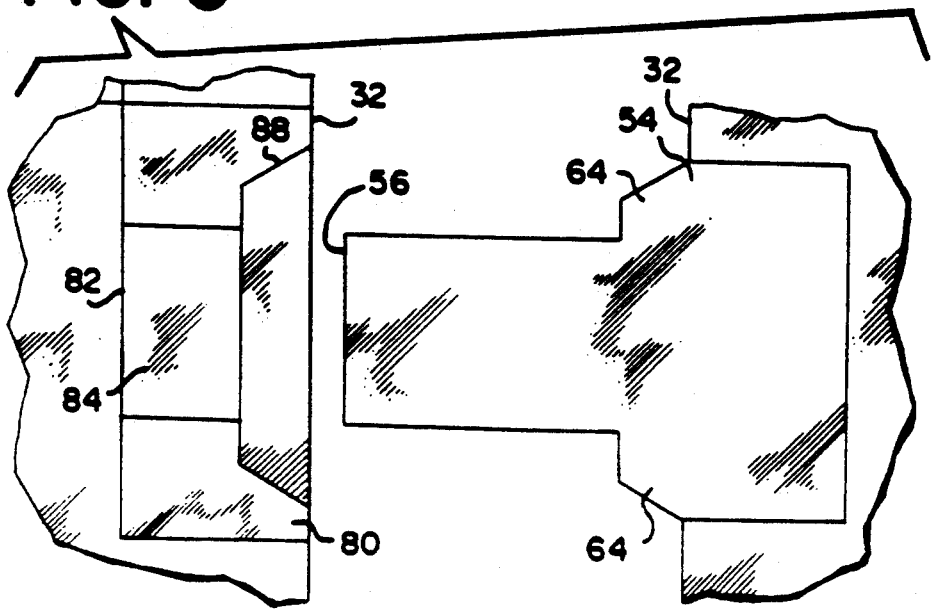
FIG. 5 is a plan view thereof, from below.

With further reference to FIGS. 3-5, block 80 has a guide groove 84 on its surface passed by tab 50. Groove 84 is substantially equal in width to the width of tab 50 adjacent the distal end 56, and has a tapering inlet area 88. Inlet area 88 narrows at least laterally in the direction of insertion of tab 50, and can also taper longitudinally. As a result, tab 50 inherently is brought into correct alignment with the groove 84, with insertion of the tab 50 along groove 84, and initial insertion is made easier by the fact that in the inlet area the groove 84 is much wider than the distal end 56 of tab 50.

The tapered inlet 88 has a further function besides guiding tab 50 toward alignment with the block 80. Tab 50 has shoulders 64 at its proximal end 54, which shoulders are contoured to exactly complement the tapering inlet 88 of groove 84. When the liner sections 30 are nearly in abutment, the shoulders 64 come within the confines of tapering inlet 88, further aligning the tab to the block. When the liner sections 30 are fully in abutment, shoulders 64 abut with the walls of inlet 88, and thus provide positive mechanical locking of the flanges 22 against relative lateral displacement, as might occur due to the resilience of a tab 50 lacking shoulders 64.

The engagement of the tabs 50 with blocks 80 thus proceeds through several stages. Initially, the tabs 50 need only be generally lined up with grooves 84, an error in positioning up to the lateral width of tapered inlet 86 being permissible. With further advance of the sections 30, tab 50 passes into the narrower section of groove 84, and tab 50 raises resiliently from its rest position by operation of ramp 66 passing over the surface of groove 84. When tab 50 is in the narrow portion of groove 84, the liner sections are substantially aligned, but remain free to be displaced laterally due to the resilient nature of tab 50. Nearing abutment of the edges 32 of liner sections 30, the shoulders 64 of tab 50 come into proximity with the walls of tapering inlet 88. At full insertion, shoulders 64 and inlet 88 come into contact and the hook edge or stop 62 of tab 50 snaps resiliently over the far edge or counter stop 82 of block 80. The inlet to the block is slightly narrower than the block, such that lateral edges of the block provide structures resisting lateral displacement of the tab 50 in the block 80. In the fully-inserted position of the tab and block, the liner sections 32 are secured against lateral displacement due to abutment of the tab shoulders 64 and the groove inlet 88. The sections 32 are also fixed against longitudinal displacement (i.e., separation of the sections 32) by the engagement of stop 62 and counter stop 82. In this manner, the clasp mechanism positions and locks the facing sections 32, and the assembler is required only to generally align and push together the facing sections 32.

Figure 6:
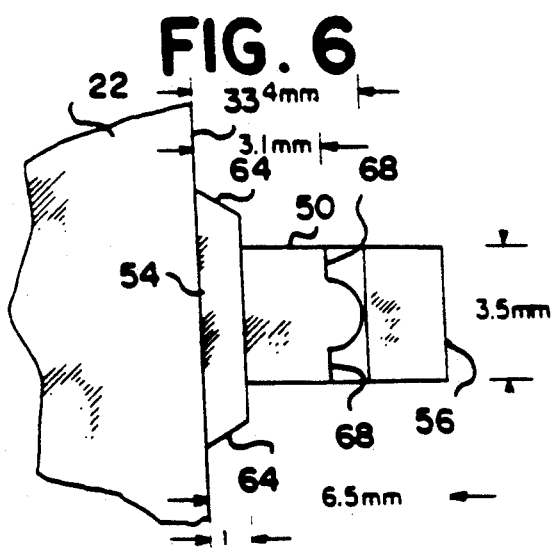
FIG. 6 is a plan view of an embodiment of the invention in detail, with a particular tab structure, shown from above with respect to FIG. 4.

It may be desirable to dimension tab 50 and block 80 such that the stop 62 of tab 50 just clears the counter stop 82 when the shoulders 64 and inlet 88 are in contact. FIG. 6 illustrates an embodiment of stop 62 with two rearwardly directed teeth 68. The teeth define two spaced surfaces for engaging over the counter stop. Should the tab 50 or the stop 62 thereof be slightly misoriented relative to the counter stop, the two spaced contact surfaces engage the counter stop more securely than a single flat surface. The teeth can be made of a limited thickness, whereby the teeth are at least slightly deformable due to resilience of the material of tab 50, normally plastic. As the stop 62 of the tab 50 passes over the counter stop 82 of the block 80, the two teeth 68 are then urged laterally outward from one another due to resilient pressure of the tab 50 against the block 80. This effectively increases the distance between the abutting edges 32 of the liner sections 32 and the stop 62, whereby the tab more readily snaps over the block. When the tab 50 has snapped over the block, the downward pressure of the tab on the teeth is relieved, and any remaining lateral deformation of the teeth tends to more tightly urge the facing sections 32 together.

The fastener 44, embodying another aspect of the invention, on the larger of the flanges 22 is provided with a tab 70 which engages a U bow 72 on the facing section, as shown in FIG. 1. Tab 70 can be aligned as shown with its width extension oriented parallel to the Z axis. Tab 70 has a stop 74 and a distal ramp portion similar to the arrangement of tab 50 on the smaller flange. The tapering section resiliently deflects tab 70 radially inwardly to pass the radially outer web of U bow 72. When the hook or stop 74 of tab 70 passes the U bow, the tab 70 snaps radially outwardly to fix the sections 30 against separation.

The internal opening of U bow 72 is large enough to accommodate the distal end of tab 70, i.e., the maximum dimension of the distal ramp. Accordingly, to securely and accurately position the liner sections 30 at the larger flange, tab 70 is provided with a proximal taper 76, shown in FIG. 1. The proximal taper resides within the U bow when the liner sections are fully in abutment. The proximal taper, at its largest dimension immediately adjacent the facing edge 32 of the respective liner section 30, is substantially the same size as the opening in U bow 72. Accordingly, upon full insertion of tab 70, the liner sections are fixed against separation by stop 74 clasping around the far edge of U bow 72, and also are fixed against displacement laterally of the insertion direction by engagement of proximal taper 76 in the opening of U bow 72. As shown in FIG. 1, the proximal taper of tab 70 is disposed on the side of tab 70 opposite from the stop 74. As tab 70 passes through U bow 74, the distal ramp deflects the tab inwardly, but when the proximal taper enters U bow 74 (approaching full insertion of tab 70), the proximal tab exerts additional pressure on tab 70 to deflect in the direction which will snap stop 74 into its locking position. This pressure remains in place when the tab locks behind the U bow, and very positively positions and locks the liner sections together.

The liner sections of the invention are preferably injection molded plastic, with the tabs and their receptacles formed integrally with the funnel and flange portions. The liner can be made in any dimensions, as appropriate for a particular tube. In addition to the clasps and structures shown, it is also possible to include additional clasps and the like for engaging with the deflection coil windings, junction strips for electrical connections, etc.

The clasp structure is preferably arranged on the end flanges 22 and 22' of each liner section 30, and for compactness preferably resides substantially in a plane parallel to the end flange. The clasp structures on the larger and smaller flanges are oriented such that the width extensions of the tabs are oriented in mutually perpendicular planes. The tabs 50 on the smaller flange have a width extension parallel to the plane of the smaller flange, i.e., in a plane perpendicular to the Z axis. The tabs 70 on the larger flanges have a width extension in a plane parallel to the Z axis. Accordingly, the tabs are deflected by their ramps and snap into locking engagement in mutually perpendicular directions. It is possible to arrange the tabs and their complementary receptacles on both the smaller and larger flange to include the tapering shoulder and complementary slot arrangement discussed above with respect to the smaller flange. It is also possible as shown in FIGS. 1 and 2 to provide the complementary slot arrangement on one of the two flanges (the smaller one in the example shown) and to use the proximally tapering tab and U bow receptacle on the other of the two flanges.

What is claimed is:

1. A deflection yoke for a video display apparatus, comprising:
    a deflection winding; and
    a pair of liner sections fitted with an interengaging fastener operable to attach together the pair of liner sections when the sections are brought together during assembly, the liner sections providing support for said deflection winding for enclosing said deflection yoke around a neck of a cathode ray tube, the fastener including, a tab attached to and protruding from one of the sections having a hook adjacent a first end of said tab and being engageable with a block that is attached to the other one of the sections, the block having an inlet portion tapering inwardly in a direction along which the sections are brought together for guiding the tab into locking position with the block, the block having an abutment beyond the inlet portion, the block and the tab being complementarily dimensioned such that the hook snaps over the abutment upon bringing the sections together.

2. A deflection yoke according to claim 1 wherein the pair of liner sections forming a first flange oriented substantially perpendicular to a longitudinal axis of said deflection yoke.

3. A deflection yoke according to claim 2, wherein the block and the tab protrude axially above a surface of the flange, and further comprising a second interengaging fastener for attaching together the two sections at a point axially spaced from the flange.

4. A deflection yoke according to claim 3, wherein the tab has a width extension substantially parallel to a surface of the flange and wherein the inlet portion tapers in a plane of the width extension.

5. A deflection yoke according to claim 2 wherein the sections form a second flange that is larger than said first flange, the first and second flanges are located adjacent axial ends of the sections, wherein the tab and block are disposed on one of said flanges and wherein a second interengaging fastener is disposed on the other one of said flanges.

6. A deflection yoke according to claim 5, wherein said second interengaging fastener includes a hook and an abutment operable to attach the pair of liner sections inwardly over the tube.

7. A deflection yoke according to claim 1 wherein the tab has a shoulder adjacent a second end of the tab tapering inwardly for engaging the tapering inwardly inlet portion of the block in a complementarily manner when the tab and the block are in the locking position.

8. A deflection yoke for a cathode ray tube, the tube having a neck with a smaller diameter portion and a larger diameter portion disposed along an axis of the tube, comprising:
- a deflection winding; and
- a pair of liner sections fitted with an interengaging fastener operable to attach together the pair of liner sections to enclose around the neck of the tube, the fastener including, a tab protruding from one of the pair of liner section shaving a hook adjacent a distal end of the tab and being engageable with a block fitted on the other one of the pair of liner sections, the block having an abutment positioned such that the hook snaps over the abutment upon bringing together the pair of liner sections, the block defining a tapering inlet opening wider than a width of the tab at a distal end of the tab for guiding the tab into a locking position, the tab having a shoulder section adjacent a proximal end of the tab such that the block and the shoulder section have complementary tapering surfaces that engage each other when the tab is in the locking position.

9. A deflection yoke according to claim 8, wherein the pair of liner sections forming a flange oriented substantially perpendicular to a longitudinal axis of said deflection yoke wherein the block and the tab protrude axially above a surface of the flange, and wherein the tab has a width extension parallel to a plane of said surface of the flange.

10. A deflection yoke according to claim 9, wherein the tab is tapered to widen toward a proximal end and the block is tapered to narrow in an insertion direction of the tab.

11. A deflection yoke according to claim 10, wherein the block includes a surface groove dimensioned to guide the hook of the tab in the insertion direction, the surface groove narrowing from the tapering inlet and substantially corresponding to the tab adjacent the abutment of the block.

12. A deflection yoke according to claim 11 further comprising a second fastener for attaching together the pair of liner sections at a point axially spaced from the flange.

13. A deflection yoke according to claim 12, wherein the second fastener is disposed on a second flange of the pair of liner sections.

14. A deflection yoke according to claim 8 wherein said block includes a groove communicating with said inlet opening at one end of said groove and with said abutment at a second end of said groove for receiving a portion of said tab between the two ends of said groove.

15. A deflection yoke according to claim 14 wherein said groove has an open top such that when said tab is received in said groove a portion of said tab extends outside said groove.

* * * * *